United States Patent [19]

Molloy

[11] 3,880,927

[45] Apr. 29, 1975

[54] β-PHENYL-β,β-DIFLUOROETHYLAMINES

[75] Inventor: Bryan B. Molloy, Indianapolis, Ind.

[73] Assignee: Eli Lilly and Company, Indianapolis, Ind.

[22] Filed: June 19, 1972

[21] Appl. No.: 263,908

[52] U.S. Cl....... 260/570.5 R; 260/349; 260/465 G; 260/476 R; 260/501.1; 260/501.21; 260/515 A; 260/544 M; 260/558 R; 260/592; 260/649 R; 260/649 F; 424/330
[51] Int. Cl............................................ C07c 87/28
[58] Field of Search...... 260/570.5 R, 501.1, 501.21

[56] References Cited
UNITED STATES PATENTS
3,719,713   3/1973   Molloy et al.................... 260/570.5

Primary Examiner—R. V. Hines
Attorney, Agent, or Firm—James L. Rowe; Everet F. Smith

[57] ABSTRACT

β-Phenyl-β,β-difluoroethylamines, sympathomimetic amines with reduced central and enhanced peripheral activity.

6 Claims, No Drawings

β-PHENYL-β,β-DIFLUOROETHYLAMINES

BACKGROUND OF THE INVENTION

A large number of β-phenylethylamines having sympathomimetic activity are known. In general, these sympathomimetic drugs have hydroxyl substituents in the phenyl ring, usually in the meta and/or para positions. Furthermore, the most active sympathomimetic compounds have an hydroxyl group on the β-carbon of the ethane chain. In some instances, both β-hydrogens are replaced by a ketone group with retention of activity. The α-carbon of the ethane chain may carry from one to two alkyl groups. Finally, the most active sympathomimetic compounds are the N-methyl, N-isopropyl and primary amines. Among the more active sympathomimetic amines are the hormones—epinephrine and norepinephrine—and the synthetic compounds—isoproterenol, amphetamine, methamphetamine, ephedrine and mephenterine. These drugs have a wide variety of activities in the central nervous system and are classified, according to Goodman and Gillman, *Pharmacological Basis of Therapeutics*, 4th Ed., Chapter 24, (The McMillan Company, New York, N.Y.-1970), as affecting α-receptors or β-receptors, α-receptor activity including allergic reactions, nasal decongestion, pressor activity and other local vasoconstriction while β-activity includes broncodilator, cardiac activity and muscle vessel dilitation. Finally, the drugs may show generalized excitor activity on the central nervous system as well as anorectic activity.

Substitution of the hydroxyl groups in epinephrine with halogen has lead to compounds having intensified β-receptor activity; for example, N-[β-(3,4-dichlorophenyl)-β-hydroxylethyl] isopropylamine also known as DCI (in which, in addition, the methylamine group of epinephrine is replaced by an isopropylamine group). The compound is claimed in U.S. Pat. No. 2,938,921. The corresponding β-chloroethyl derivative is also known and is said to be a weak β-blocker according to J. Med. Chem., 13, 398 (1970). The corresponding β-fluoroethyl derivative is also known [see *Pharm. Ed. Sci.*, 25, 901 (1970); no mention is made therein of its pharmacological or other utility].

β-Chloro-β-phenylethylamines, particularly those in which both hydrogens of the amine group are substituted with alkyl, are known to be useful as intermediates in chemical synthesis. These β-chloroethylamines readily form aziridines, which are extremely reactive.

β-Phenethylamines with halogens on the β-carbon other than chlorine are rare except that recently β-fluoro-β-phenyl-α-methylethylamine and β,β-difluoro-β-phenyl-α-methylethylamine, sympathomimetic amines with diminished central effects, have been disclosed by Fuller, Molloy, Roush, and Hauser, *Biochemical Pharmacology*, 21, 1299–1307 (1972).

SUMMARY

This invention provides compounds of the formula:

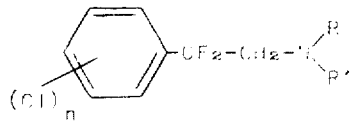

wherein R is hydrogen, $C_1-C_3$ alkyl or cyclopropyl; R' is hydrogen or $C_1-C_3$ alkyl; and n is 0–2. Also included within the scope of this invention are acid addition salts of the above amines formed with pharmaceutically-acceptable, non-toxic acids.

Illustrative of R and R' when they are $C_1-C_3$ alkyl are methyl, ethyl, n-propyl and isopropyl.

Compounds represented by the above formula include the following:

β-(2-chlorophenyl)-β,β-difluoroethylamine
N-[β-(3,4-dichlorophenyl)-β,β-difluoroethyl] ethylamine
N-[β-(2,4-dichlorophenyl)-β,β-difluoroethyl] cyclopropylamine
N-(β-phenyl-β,β-difluoroethyl) N-methyl ethylamine
N-(β-phenyl-β,β-difluoroethyl) diethylamine
N-[β-(3,4-dichlorophenyl)-β,β-difluoroethyl] n-propylamine The free bases represented by the above formula are high boiling oily substances having a fishy odor. The acid addition salts thereof formed with pharmaceutically-acceptable, non-toxic acids are high melting, white crystalline solids. Included within the term "pharmaceutically-acceptable, non-toxic acids" are inorganic acids such as hydrochloric acid, nitric acid, phosphoric acid, sulfuric acid, hydrobromic acid, hydriodic acid, nitrous acid, phosphorus acid and the like, as well as salts of non-toxic organic acids including acetic acid, maleic acid, malic acid, tartaric acid, citric acid, benzoic acid, 2,4-dinitrobenzoic acid, p-chlorobenzoic acid, naphthoic acid, p-toluenesulfonic acid and the like.

β,β-Difluoro-β-phenylethylamines according to the above formula can be prepared by several alternate procedures depending on the degree of substitution on the amine nitrogen. Compounds wherein R and R' are both hydrogen are prepared by a synthetic route whose initial steps were first described in *Zhur. Obshchei. Khim.*, 28, 772 (1948), which procedure involves the chlorination of a phenylacetonitrile with sulfuryl chloride. The resulting α,α-difluoro compound is prepared therefrom by treatment with antimony trifluoride. 2,2-Difluorophenylacetonitrile thus prepared can be directly reduced to the corresponding β-phenyl-β,β-difluoroethylamine, using diborane or lithium aluminumhydride as the reducing agent. Alternately, the α,α-difluoroacetonitrile can be hydrolyzed to the corresponding amide which can in turn be reduced to the β,β-difluoroethylamine with lithium aluminumhydride. Compounds in which either or both R and R' are other than hydrogen are prepared by hydrolyzing an α,α-difluorophenylacetamide prepared as above with base to yield an α,α-difluorophenylacetic acid. This acid can be converted to the corresponding acid chloride with oxalyl chloride or thionyl chloride and the acid chloride thus formed reacted with an appropriate amine to yield the desired N-alkyl or N,N-dialkyl 2,2-difluorophenylacetamide. Reduction of the amide with diborane then yields the desired N-alkyl or N,N-dialkyl β-phenyl-β,β-difluoroethylamine.

An alternative preparation of α,α-difluorophenylacetic acids or their lower alkyl esters, which compounds can be converted to the corresponding amides by standard procedures, involves the dichlorination of an acetophenone to yield an ω,ω-dichloro derivative. Treatment of the dichloro compound with alkali yields a benzylic acid which is readily converted to the corresponding lower alkyl ester. Oxidation of the alcohol group of the benzylic ester ith lead tetraacetate yields a phenylglyoxalate which in turn is readily converted to an α,α-difluorophenylacetic acid ester on treatment with sulfur tetrafluoride.

Using a still different synthetic procedure, the same sulfur tetrafluoride reaction can be used to form a β,β-difluoro-β-phenylethylbromide from the corresponding ω-bromoacetophenone. Reaction of the difluoro bromide with sodium azide yields a β-phenyl-β,β-difluoroethylazide which is readily reduced with sodium borohydride to the desired β-phenyl-β,β-difluoroethylamine.

Acid addition salts coming within the scope of this invention can be prepared by dissolving a given free base in ether and adding an equivalent of a suitable non-toxic acid, usually in ether solution, and then isolating the thus-formed ether-insoluble salt by filtration. Alternatively, the amine base can be dissolved in ethanol or other lower alcohol and an equivalent of the acid added, also in ethanol solution. In this instance, the acid addition salts thus formed are alcohol-soluble and are isolated by evaporation of the solvent in vacuo.

As previously stated, compounds coming within the scope of Formula I above are sympathomimetic amines. The difluoro compounds are longer acting than the corresponding derivatives containing a β-hydroxyl group. In addition, the compounds are relatively more active peripherally and relatively less active as central nervous system stimulants than prior art sympathomimetic amines. Depending upon the nature of the group attached to the amine function, the compounds act upon either or both α- and β- receptor sites. In addition, the compounds are monamine oxidase inhibitors. Thus, compounds according to the above formula are potentially useful as nasal decongestants, lipolytic or anorectic drugs, bronchodilators or generally as drugs having similar pharmacological activities to those possessed by sympathomimetic amines.

EXAMPLE 1

β-Phenyl-β,β-Difluoroethylamine 300 ml. of sulfuryl chloride were placed in a 2 l. flask equipped with addition funnel, stirring means and drying tube. 234 g. of phenylacetonitrile were added and the mixture stirred overnight at room temperature. Excess sulfuryl chloride was removed by heating to 100°C. Distillation of the residue yielded α,α-dichlorophenylacetonitrile formed in the above reaction: B.P. = 86°-91°C. at 8 mm/Hg. Yield = 322 g.

90 g. of α,α-dichlorophenylacetonitrile were added to 105 g. of antimony trifluoride in a 1 l. flask. The mixture was heated and a distillate boiling in the range 100°-150°C. was collected. The distillate was washed seven times with 2 N. aqueous hydrochloric acid and dried. Redistillation through a jacketed Vigreaux column at atmospheric pressure yielded α,α-difluorophenylacetonitrile: B.P. = 147°-150°C.

A mixture of 1.14 g. of lithium aluminumhydride and 230 ml. of ether was placed in a 500 ml. round-bottom flask equipped with magnetic stirrer, addition funnel, and condenser with drying tube. A solution of 4.59 g. of α,α-difluorophenylacetonitrile in 20 ml. of ether was added dropwise with stirring. After the addition had been completed, the reaction mixture was stirred at room temperature for an additional 1.5 hrs. and was then heated at refluxing temperature for 30 minutes. Excess lithium aluminumhydride was decomposed by adding 5.0 ml. of a saturated sodium sulphate solution followed by 5 ml. of water. The ether solution was dried and the ether removed in vacuo leaving about 3.5 g. of oil. An NMR spectrum of the oil was consistent with the structure of β-phenyl-β,β-difluoroethylamine formed in the above reaction.

The residual oil was dissolved in acid, the acidic solution extracted with the ether, the ether extract discarded, the aqueous solution made basic, and the insoluble free base thus formed extracted into ether. This procedure was repeated twice. β-Phenyl-β,β-difluoroethylamine free base thus isolated was dissolved in 2 N aqueous hydrochloric acid and water removed from the solution by evaporation in vacuo. Crystallization of the resulting solid from methanol and acetone yielded β-phenyl-β,β-difluoroethylamine hydrochloride melting at about 176°-8°C. after recrystallization from a chloroform-acetone solvent mixture.

Following the above procedure β-(4-chlorophenyl)-β,β-difluoroethylamine was prepared from 4-chlorophenylacetonitrile except that diborane in tetrahydrofurane was used in place of lithium aluminumhydride to reduce the α,α-difluoro-4-chlorophenylacetonitrile. β-(4-chlorophenyl)-β,β-difluoroethylamine hydrochloride thus prepared melted at about 201°-206°C. after recrystallization from isopropyl alcohol.

Analysis:
Calc: C, 42.13; H, 3.98; N, 6.14; Cl, 31.09; F, 16.66
Found: C, 42.30; H, 4.20; N, 6.32; Cl, 30.97; F, 16.55

EXAMPLE 2

N-(β-Phenyl-β, β-difluoroethyl) Isopropylamine

A mixture of 50 ml. of concentrated sulfuric acid and 10 g. of α,α-difluorophenylacetonitrile obtained by the procedure of Example 1 was stirred at room temperature overnight and then poured onto ice. Crystalline α,α-difluorophenylacetamide formed in the above reaction separated as a crystalline mass and was isolated by filtration. The recovered amide was dissolved in 250 ml. of 10% aqueous sodium hydroxide and the mixture refluxed overnight. The cooled reaction mixture was extracted 3 times with ether, and the ether extracts discarded. The aqueous phase was acidified with 2 N. sulfuric acid and α,α-difluorophenylacetic acid formed in the above reaction was extracted from the acidic solution with ether. The ether layer was separated. Evaporation of the ether therefrom yielded α,α-difluorophenylacetic acid as a residue, melting at 74°-75°C. after repeated recrystallization from hexane.

A solution of 4.86 g. of α,α-difluorophenylacetic acid in 125 ml. of benzene was placed in a three-neck, round-bottom flask equipped with magnetic stirrer, addition funnel and drying tube. About 12.1 ml. of oxalyl chloride were added in dropwise fashion. The reaction mixture was heated at refluxing temperatures for about 2 hours and then cooled. Volatile constituents were removed by evaporation in vacuo. The resulting residue, consisting of α,α-difluorophenylacetyl chloride formed in the above reaction, was dissolved in about 25 ml. of ether with cooling. 5 ml. of isopropylamine were added with caution. The reaction mixture was allowed to warm to room temperature, at which temperature it was stirred for about one hour during which time a solid formed. 25 ml. of 2 N aqueous hydrochloric acid were added with cooling. The acidic mixture was extracted four times with ethyl acetate, and the ethyl acetate extracts were washed successively with dilute aqueous hydrochloride acid, 10 percent aqueous sodium carbonate and water. Evaporation of the ethyl acetate in vacuo yielded N-isopropyl α,α-difluorophenylacetamide melting at about 60°–62°C. after recrystallization from cyclohexane.

Analysis:
Calc: C, 61.95; H, 6.19; N, 6.56; F, 17.82
Found: C, 61.66; H, 6.38; N, 6.77; F, 17.81

Following the procedure of Example 1, N-isopropyl α,α-difluorophenylacetamide was reduced with diborane in tetrahydrofuran. N-(β-Phenyl-β,β-difluoroethyl) isopropylamine formed in this reaction was isolated and purified by the procedure of Example 1. Recrystallization of the hydrochloride salt formed as in Example 1 yielded N-(β-phenyl-β,β-difluoroethyl) isopropylamine hydrochloride melting at about 182°–4°C.

Analysis:
Calc: C, 56.05; H, 6.84; N, 5.94; Cl, 15.04; F, 16.12
Found: C, 55.81; H, 7.01; N, 6.21; Cl, 15.27; F, 16.41

Following the above procedure, but substituting cyclopropylamine for isopropylamine, N-cyclopropyl α,α-difluorophenylacetamide was prepared melting at about 116°–18°C.

Analysis:
Calc: C, 62.55; H, 5.24; N, 6.63; F, 17.99
Found: C, 62.31; H, 5.42; N, 6.87; F, 17.76

Still following the above procedure, the cyclopropylamide was reduced with diborane to form N-(β-phenyl-β,β-difluoroethyl) cyclopropylamine whose hydrochloride salt melted at about 186°–8°C. after recrystallization from an isopropyl alcohol-cyclohexane solvent mixture.

Analysis:
Calc: C, 56.53; H, 6.04; N, 5.99; Cl, 15.17; F, 16.26
Found: C, 56.47; H, 5.86; N, 5.83; Cl, 15.33; F, 16.05;

Other compounds preparable by the above procedure include N-[β-(4-chlorophenyl)-β,β-difluoroethyl] cyclopropylamine whose hydrochloride salt melts at about 202°–4°C.

Analysis:
Calc:   C, 49.27; H, 4.89; N, 5.23; Cl, 26.45; F, 14.17
Found:  C, 48.99; H, 5.02; N, 5.31; Cl, 26.28; F, 13.98

N-[β-(4-chlorophenyl-β,β-difluoroethyl] isopropylamine whose hydrochloride salt melts at about 208°–10°C.

Analysis:
Calc: C, 49.09; H, 5.24; N, 5.21; Cl, 26.35; F, 14.12
Found: C, 48.86; H, 5.44; N, 5.43; Cl, 26.21; F, 14.40

EXAMPLE 3

β-(3,4-Dichlorophenyl)-β,β-Difluoroethylamine

A solution of 97.9 g. of 3',4'-dichloroacetophenone and a catalytic quantity of dibenzoyl peroxide in one liter of ether was placed in a 2 liter round-bottom flask equipped with stirrer, condenser, addition funnel, and thermometer. 27 ml. of bromine were added dropwise to the ethereal solution over a 2-hour period. The reaction mixture was stirred for 1 hour after all the bromine had been added. The ether layer was washed six times with water to remove excess bromine and hydrogen bromide formed in the above reaction and once with a saturated sodium chloride solution and was then dried. Evaporation of the ether yielded ω-bromo-3',4'-dichloroacetophenone formed in the above reaction.

A mixture of 26.8 g. of ω-bromo-3',4'-dichloroacetophenone and 43.2 g. of sulfur tetrafluoride with 0.5 ml. of water as a catalyst was kept in a sealed pressure vessel at room temperature for about 20 hours. The reaction mixture was diluted with ether and the ethereal solution washed twice with water, once with saturated aqueous sodium carbonate and once with saturated aqueous sodium chloride. The ethereal solution was dried and the ether evaporated therefrom in vacuo. The resulting residue was distilled at 0.15 mm/Hg through a six-inch jacketed Vigreaux column. β-(3,4-dichlorophenyl)-β,β-difluoroethylbromide prepared by the above procedure distilled in the range 74°–80°C.

Analysis:
Calc: C, 13.13; H, 1.74; F, 13.11; Br, 27.56; Cl, 24.46
Found: C, 33.37; H, 1.89; F, 12.92; Br, 27.81; Cl, 24.19

A solution of 8.7 g. of β-(3,4-dichlorophenyl)-β,β-difluoroethylbromide in 60 ml. of dimethylacetamide was placed in 200 ml. round-bottom flask equipped with magnetic stirrer. A solution of 2.93 g. of sodium azide in 15 ml. of water was added and the resulting mixture heated to refluxing temperature for about 3 days. The reaction mixture was cooled and the solvents removed by evaporation in vacuo. The resulting residue containing β-(3,4-dichlorophenyl)-β,β-difluoroethylazide formed in the above reaction was dissolved in benzene. The benzene layer was washed with water and saturated aqueous sodium chloride. The aqueous washes were combined and extracted three times with benzene. The benzene layers were combined, washed with a saturated sodium chloride solution and dried. Evaporation of the solvents in vacuo left as a residue β-(3,4-dichlorophenyl)-β,β-difluoroethylazide.

A solution of 7.52 g of β-(3,4-dichlorophenyl)-β,β-difluoroethylazide formed in the above reaction and 75 ml. of isopropyl alcohol was placed in a 250 ml. round-bottom flask equipped with magnetic stirrer, drying tube and condenser. 2.85 g. of sodium borohydride were added and the mixture heated to reflux overnight. The solvents were removed by evaporation in vacuo. The resulting residue was dissolved in water. 10 percent aqueous sodium carbonate was added and the resulting mixture extracted three times with ether. The ether extracts were combined and extracted twice with 2 N aqueous hydrochloric acid. The acidic extracts were combined and the water removed therefrom by evaporation in vacuo. The resulting solid residue was recrystallized from isopropyl alcohol yielding β-(3,4-dichlorophenyl)-β,β-difluoroethylamine hydrochloride melting at about 210°–230°C. with decomposition.

Analysis:
Calc: C, 36.60; H, 3.07; N, 5.34; F, 40.52; Cl, 14.47
Found: C, 36.33; H, 3.35; N, 5.60; F, 40.30; Cl, 14.56

β-(3,4-dichlorophenyl)-β,β-difluoroethylamine free base is isolated from the hydrochloride salt by dissolving the salt in aqueous alkali, extracting the free base with ether and removing the ether by evaporation in vacuo leaving the free base as an oily residue.

EXAMPLE 4

N-(β-Phenyl-β,β-difluoroethyl) Dimethylamine

A mixture of 24 g. of methyl phenylglyoxalate, 63 g. of sulfur tetrafluoride, and as a catalyst 2.5 g. of anhydrous hydrogen fluoride, were placed in a pressure vessel and heated at about 150°C. for about 16 hours. The reaction mixture was removed from the pressure vessel and poured into a mixture of ether and ethyl acetate. The organic solution was washed with water, twice with saturated aqueous sodium bicarbonate and once with saturated aqueous sodium chloride. The organic layer was dried and the solvent removed therefrom by evaporation in vacuo. The residue, comprising methyl α,α-difluorophenylacetate, was purified by distillation through a six inch jacketed Vigreaux column at a pressure of 11 mm/Hg. Methyl α,α-difluorophenylacetate thus prepared boiled in the range of 86°–88°C.

Analysis:
Calc: C, 58.06; H, 4.33; F, 20.41
Found: C, 58.24; H, 4.52; F, 20.38

About 250 ml. of methanol containing 5 g. of methyl α,α-difluorophenylacetate were placed in a 500-ml. hydrogenation bottle. The methanol was saturated at 0°C. with dimethylamine, the final uptake being 54 g. The mixture was kept under pressure at room temperature for 4 days and then removed from the hydrogenation bottle. Evaporation of the solvent in vacuo left as a residue N,N-dimethyl α,α-difluorophenylacetamide.

About 4.7 g. of the above amide dissolved in 15 ml. of tetrahydrofuran (THF) were added to 72 ml. of 1 M diborane solution in THF at 0°C. The reaction mixture was heated at reflux temperature for about 2 hours and was then cooled with an ice bath. About 20 ml. of 2 N aqueous hydrochloric acid were added. The THF was removed by evaporation in vacuo. The acidic solution was extracted three times with ether and the ether extracts discarded. The acidic aqueous solution was then made basic with an excess of 10 percent sodium carbonate solution. N-(β-Phenyl-β,β-difluoroethyl) dimethylamine formed in the above reaction was insoluble in aqueous alkali and was extracted into ether. The ether extract was washed with 10 percent aqueous sodium carbonate. The ether extract was then extracted thrre times with 2 N aqueous hydrochloric acid. The acidic extracts were combined and the water removed therefrom by evaporation in vacuo. The resulting residue, comprising N-(β-phenyl-β,β-difluoroethyl) dimethylamine hydrochloride, melted at about 142°–5°C. after recrystallization from ispropyl alcohol.

Analysis:
Calc: C, 54.18; H, 6.37; N, 6.32; f, 17.14; Cl, 15.99
Found: C, 53.94; H, 6.62; N, 6.27; F, 16.96; Cl, 15.98

EXAMPLE 5

N-[β-(3,4-Dichlorophenyl)-β,β-Difluoroethyl] Isopropylamine

A solution containing 190 g. of 3',4'-dichloroacetophenone in 700 ml. of glacial acetic acid was placed in a 2 liter three-neck round-bottom flask equipped with stirrer, thermometer and bubble tube. Chlorine gas, which had been scrubbed with sulfuric acid, was passed into the solution at such a rate that the temperature stayed below about 60°C., and continued until the color of the solution became yellow (approximately 2.5 hours). The reaction mixture was then poured over a 1 liter mixture of ice and water and the aqueous layer extracted twice with benzene. The benzene extracts were combined, washed three times with water, once with saturated aqueous sodium chloride and then dried. Evaporation of the solvent yielded a solid residue comprising ω,ω,3',4'-tetrachloroacetophenone. The acetophenone was added to a solution of 120 g. of sodium hydroxide in 700 ml. of water, the addition rate being such that the temperature of the solution did not exceed about 60°C. After all of the solid compound had been added, the reaction mixture was heated at 65°C. for 1 hour. Water was then added and the aqueous layer extracted with ethyl acetate. The alkaline aqueous layer was acidified with 120 ml. of 12 N aqueous hydrochloride acid and the resulting acidic aqueous layer extracted with ethyl acetate. The ethyl acetate extracts were combined, washed with saturated aqueous sodium chloride and dried. Evaporation of the solvent left as a residue 3',4'-dichloromandelic acid.

248.5 g. of the above mandelic acid were mixed with 4 l. of 95 percent ethanol and the solution saturated with hydrogen chloride. The reaction mixture was heated to reflux overnight, cooled and the ethanol removed by evaporation in vacuo. The residue, comprising ethyl 3',4'-dichloro mandelate formed in the above reaction was dissolved in ethyl acetate and the ethyl acetate solution washed successively with water, saturated aqueous sodium bicarbonate and saturated aqueous sodium chloride, and then dried. Evaporation of the solvent in vacuo yielded 205 g. of methyl 3',4'-dichloromandelate which distilled in the range 124°–140°C. at 0.5 mm/Hg.

Analysis:
Calc: C, 48.21; H, 4.05; Cl, 28.47
Found: C, 48.25; H, 3.92; Cl, 28.27

A solution of 24.8 g. of methyl 3',4'-dichloromandelate in 200 ml. of anhydrous benzene was placed in a 500 ml. three-neck, round-bottom flask equipped with magnetic stirrer and drying tube. 66.5 g. of lead tetra-acetate were added, and the resulting mixture refluxed for 18 hours. The reaction mixture was cooled and lead diacetate, formed as a by-product in the above reaction, was separated by filtration. 200 ml. of saturated aqueous sodium bicarbonate were added followed by sufficient solid sodium bicarbonate to make the reaction mixture basic to litmus. The reaction mixture was extracted three times with ether, and the ether extracts combined and washed with saturated aqueous sodium chloride. The reaction mixture was dried and the solvent evaporated in vacuo. Distillation of the residual oil yielded ethyl 3',4'-dichlorophenyl-glyoxalate boiling in the range 99°–100°C. at 0.05 mm/Hg.

Analysis:
Calc: C, 48.61; H, 3.26; Cl, 28.70;
Found: C, 48.90; H, 3.42; Cl, 28.51

Following the procedure of Example 4, 22.17 g. of ethyl 3',4'-dichlorophenylglyoxalate were reacted with 42.3 g. of sulfur tetrafluoride in the presence of 2 g. anhydrous hydrogen fluoride as a catalyst. The reaction was carried out and the product isolated by the procedure of the same example. Ethyl α,α-difluoro(3',4'-dichlorophenyl)acetate formed in the above reaction distilled in the range 75°–78°C. at 0.05 mm/Hg.

Analysis:
Calc: C, 44.64; H, 3.00; Cl, 26.35; F, 14.12
Found: C, 44.45; H, 2.76; Cl, 26.08; F, 14.02

About 7.3 g. of ethyl α,α-difluoro(3',4'-dichlorophenyl)acetate were dissolved in 115 ml. of methanol to which was added 115 ml. of 10 percent aqueous sodium carbonate. The mixture was heated in the range of 60°–65°C. for 2 hours and then cooled. The methanol was removed by evaporation in vacuo. The alkaline layer was extracted twice with ether and the ether extracts discarded. The aqueous alkaline phase was then made acidic with 2N sulfuric acid. α,α-difluoro(3',4'-dichlorophenyl)acetic acid formed in the above reaction, being insoluble in aqueous acid, separated and was extracted into ether. The ether extracts were washed with water and saturated aqueous sodium chloride. Evaporation of the solvent in vacuo left α,α-difluoro(3',4'-dichlorophenyl)acetic acid as a solid residue. The acid melted at 106°–8°C. after recrystallization from cyclohexane.

A solution of 4.36 g. α,α-difluoro(3',4'-dichlorophenyl)acetic acid in 100 ml. of benzene was placed in a 250 ml. three-neck, round-bottom flask equipped with magnetic stirrer, drying tube and addition funnel. 7.8 ml. of oxalyl chloride were added to the solution in dropwise fashion. The reaction mixture was heated to reflux for 3 hours and then cooled. The volatile constituents were removed by evaporation in vacuo, high vacuum being used to remove the last traces oxalyl chloride. The residue comprising α,α-difluoro(3',4'-diphenyl)acetyl chloride formed in the above reaction was dissolved in 50 ml. of ether and the solution cooled to 0°C. 7 ml. of isopropylamine were added slowly to the ethereal solution. The reaction mixture was stirred for 1 hour at room temperature and then cooled again to 0°C. 35 ml. of 2 N aqueous hydrochloric acid were added. The acidic layer was extracted three times with ethyl acetate. The ethyl acetate extracts were combined and washed successively with dilute aqueous hydrochloric acid, 10 percent sodium carbonate solution, water and saturated aqueous sodium chloride. Evaporation of the solvent in vacuo yielded N-isopropyl α,α-difluoro-(3',4'-dichlorophenyl)acetamide which melted at 92°–3°C. after recrystallization from cyclohexane.

Analysis:
Calc: C, 46.83; H, 3.93; N, 4.96; Cl, 25.13; F, 13.47
Found: C, 47.03; H, 4.22; N, 5.20; Cl, 25.02; F, 13.48

2.5 g. of N-isopropyl α,α-difluoro(3',4'-dichlorophenyl)acetamide were dissolved in 15 ml. of THF and the solution added to 30 ml. of 1 N B$_2$H$_6$ in THF in a 100 ml. three-neck, round-bottom flask equipped with stirrer, condenser, and dropping funnel, the whole flask being kept under positive nitrogen pressure and cooled to 0°C. After the addition had been completed, the reaction mixture was heated to reflux overnight and again cooled. 15 ml. of 2 N aqueous hydrochloric acid were added and the THF removed by evaporation in vacuo. Water and 2 N hydrochloric acid were added and the aqueous solution extracted twice with ether. The ether extracts were discarded. The acidic layer was made alkaline with 2 N aqueous sodium hydroxide. N-[β-(3,4-dichlorophenyl)-β,β-difluoroethyl] isopropylamine formed in the above reaction, being insoluble in the alkaline solution, separated and was extracted into ether. The ether extracts were washed with water. The ether layer was then extracted with four 50 ml. portions of 2 N hydrochloric acid. The acidic extracts were combined and the water evaporated therefrom in vacuo leaving as a solid residue N-[β-(3,4-dichlorophenyl)-β,β-difluoroethyl] isopropylamine hydrochloride which melted at 220°–2°C. after recrystallization from isopropyl alcohol.

Analysis:
Calc: C, 43.38; H, 4.63; N, 4.60; F, 12.47; Cl, 34.92
Found: C, 43.64; H, 4.90; N, 4.80; F, 12.60; Cl, 34.80

I claim:
1. Compound of the formula

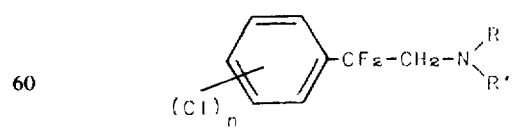

wherein R is hydrogen, C$_1$–C$_3$ alkyl or cyclopropyl; R' is hydrogen or C$_1$–C$_3$ alkyl; and n is 0–2, and acid addition salts thereof formed with pharmaceutically-acceptable, non-toxic acids.

2. A compound according to claim 1, said compound being β-phenyl-β,β-difluoroethylamine.

3. A compound according to claim 1, said compound being N-(β-phenyl-β,β-difluoroethyl) isopropylamine.

4. A compound according to claim 1, said compound being β-(3,4-dichlorophenyl)-β,β-difluoroethylamine.

5. A compound according to claim 1, said compound being N-(β-phenyl-β,β-difluoroethyl)dimethylamine.

6. A compound according to claim 1, said compound being N-(β-phenyl-β,β-difluoroethyl) cyclopropylamine.

* * * * *